March 29, 1966  R. A. PALMORE  3,242,941
LIQUID DISCHARGE CONTROL FOR DUST ARRESTER
Filed Oct. 1, 1962  2 Sheets-Sheet 1

INVENTOR.
ROBERT A. PALMORE
BY Edward C. Greey
ATTORNEY

March 29, 1966   R. A. PALMORE   3,242,941
LIQUID DISCHARGE CONTROL FOR DUST ARRESTER
Filed Oct. 1, 1962   2 Sheets-Sheet 2

INVENTOR.
ROBERT A. PALMORE
BY
ATTORNEY

United States Patent Office 3,242,941
Patented Mar. 29, 1966

3,242,941
LIQUID DISCHARGE CONTROL FOR
DUST ARRESTER
Robert A. Palmore, Louisville, Ky., assignor to American
Air Filter Company, Inc., Louisville, Ky., a corporation of Delaware
Filed Oct. 1, 1962, Ser. No. 227,235
6 Claims. (Cl. 137—396)

This invention relates to apparatus for controlling the discharge of contaminated scrubbing liquid from a wet type dust arrester.

In operating certain liquid bath dust arresters, it is conventional practice to continuously sluice or discharge contaminated liquid from the bath at a controlled rate. This prevents a condition wherein the bottom of the bath becomes packed with a hard-to-remove contaminant. In order to maintain a proper level of liquid (usually water) in the dust arrester, make up water is continuously supplied to the arrester at a rate in excess of that needed to compensate for the water being sluiced from, and evaporating from, the bath. Part of the make up water goes to maintain the desired level, and the excess water is passed to a drain. The control of the liquid bath level, within limits determined by air flow, is accomplished by liquid level control means such as disclosed in Nutting U.S. Patent 2,403,545.

When a dust arrester is being operated under continuous sluicing conditions, control of the bath water level is of course limited to those periods when sufficient water is supplied to equal the evaporation rate and the sluicing rate. If the water supply rate drops too much, or stops entirely, the bath water level of the arrester will also drop unless the outlet in the bottom of the bath is plugged.

Accordingly, this invention is directed to apparatus for automatically regulating the discharge rate of the contaminated water from the bath in accordance with the accumulation of make up water overflow. In one embodiment the apparatus comprises: valve means including a plug for the outlet of the hopper bath; a toggle mechanism including rocker means carrying the plug for movement relative to the outlet; counterweight means connected to urge the toggle mechanism in a direction moving the plug into the outlet; and means responsive to the accumulation of make up liquid overflow connected to urge the toggle mechanism in an opposite direction in proportion to the degree of accumulation of the liquid overflow.

The apparatus of the invention is arranged so that with a maximum accumulation of make up liquid overflow, the toggle mechanism is held in one extreme position wherein the plug is completely out of the path of the discharging liquid from the bath. The movable receptacle which accumulates overflow liquid is provided with an outlet through which the liquid drains at a metered rate. Thus if the rate at which make up liquid is received decreases enough that none of it overflows into the receptacle, the draining of the accumulated liquid from the receptacle at the metered rate results in a steadily decreasing force (and moment) in a plug opening direction being exerted by the receptacle upon the toggle mechanism. When the opposing moment exerted by the weight means exceeds the decreasing moment of the receptacle, the toggle mechanism will cause the rocker means to be rotatably displaced in a direction moving the plug toward a position closing the bath outlet. If the receptacle drains completely, the plug will be completely seated in the bath outlet so that discharge of contaminated liquid from the bath is completely stopped. On the other hand, if the overflow into the receptacle is simply at a reduced rate relative to normal, the plug may take a position wherein the rate of discharge of contaminated liquid from the bath is substantially reduced but not completely stopped. It is normally preferable in the operation of a dust arrester of this character that some discharge from the bath be permitted, even if it is at a relatively low rate, so long as there is sufficient make up liquid being supplied to maintain the desired level. Such an operating condition is possible with the apparatus of this invention.

Other features of the apparatus will be considered in connection with the description which follows, and which is to be taken in connection with the accompanying drawing wherein.

Figure 1:
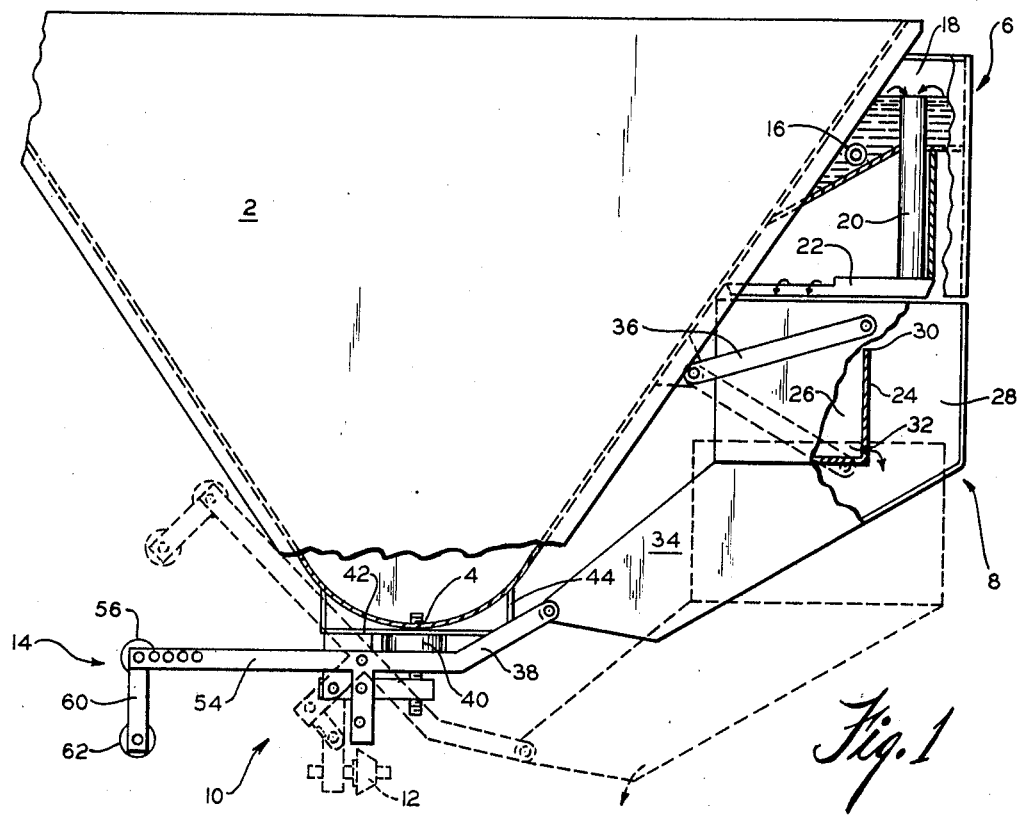
FIGURE 1 is a partly broken side view of a dust arrester hopper, liquid level control box, and the apparatus of the invention, the solid line view of the apparatus corresponding to its position when the hopper outlet is fully closed and the broken line view corresponding to its position when the hopper outlet is fully open.

Referring now to the drawing, the main parts shown in FIGURE 1 include: the dust arrester hopper 2 which contains the scrubbing liquid, usually water, and which has a discharge orifice 4 in its bottom wall through which the sluicing discharge of contaminated water from the bath passes at a predetermined metered rate; liquid level control box 6 fixedly mounted on the side of the hopper and connected to a supply of make up water; make up water overflow accumulating receptacle 8 disposed generally below the control box to receive overflow water therefrom; a toggle mechanism generally designated 10 which has a hopper outlet plug 12 carried by one of its elements; and weight means 14 connected to the toggle mechanism to oppose the force exerted upon the toggle mechanism by the receptacle 8.

The make up water is delivered through supply water pipe 16 to a compartment 18 in control box 6. The air space at the top of compartment 18 is in open communication through means not shown with the clean air side of the dust arrester, and the lower flooded portion is in communication with the water in the hopper. With this arrangement, the general character of the operation of the control box in relation to the operation of the dust arrester will be as described in the noted Nutting patent, with the level of water in compartment 18 corresponding to the level of water on the clean air side of the dust arrester. The excess of make up water supplied to compartment 18 in the control box overflows into drain pipe 20 and drains into the shallow pan 22 provided with the step side wall arrangement shown.

Receptacle 8 is sufficiently wide to receive the overflow from pan 22, with normal overflow being over only the lower edge of the step side wall. The receptacle is in the form of an open top box divided by transverse partition 24 into an accumulating chamber or tank 26 and the discharge chamber 28. The top edge 30 of partition 24 is somewhat below the top edge of the perimetric wall of the receptacle so that the tank 26 is limited in the quantity of overflow water it can accumulate. An orifice 32 near the bottom edge of the partition permits accumulated water in tank 26 to flow at a metered rate into the discharge chamber 28. The water which passes into the discharge chamber by way of either top edge 30 or orifice 32 drops into the chute 34 and passes out of the open bottom end of the chute into a pan or the like (not shown) which leads to a disposal point.

The receptacle and chute form a unitary assembly supported for translational movement in a nearly vertical direction, in accordance with the accumulated quantity of water in tank 26, by a parallel linkage arrangement. Each of a pair of upper links 36 has one end pivotally secured to the hopper, and the other end pivotally secured to the respective side wall of the receptacle; and each of a pair of lower links 38 has one end pivotally secured to the chute side wall, and the other end pivotally secured to the toggle mechanism.

Figure 3:
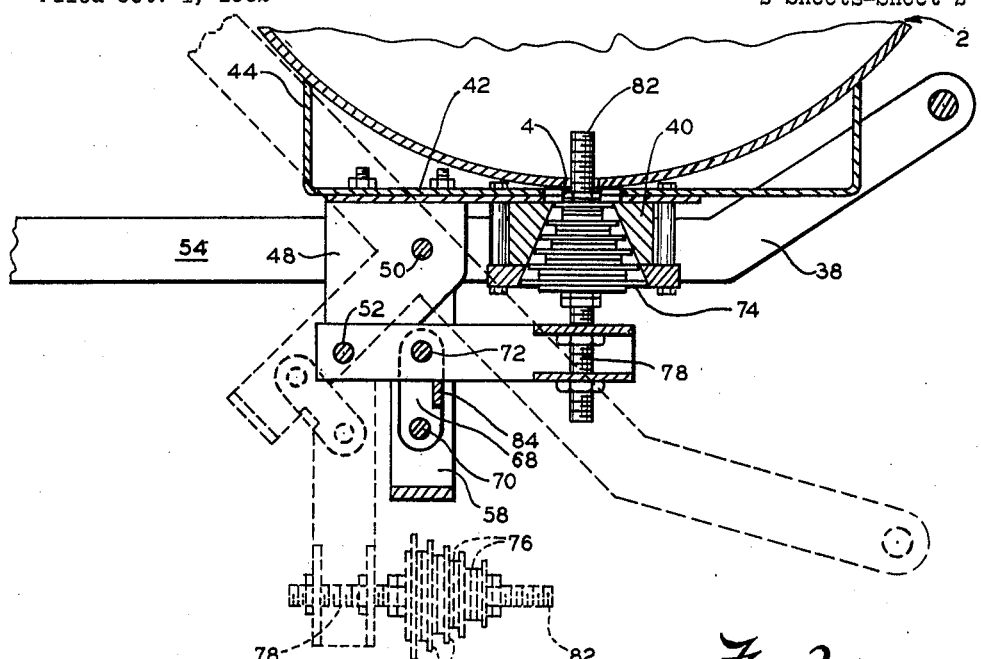
FIGURE 3 is a fragmentary vertical sectional view illustrating certain details of the apparatus, with the solid line and broken line views consistent with the FIGURE 1 positions.

The toggle mechanism is secured in a position relative to the outlet in the bottom of the hopper so that the rocker means carrying plug 12 can be pivoted between one extreme position wherein the outlet is completely closed and an opposite extreme position wherein the plug is completely out of the path of the discharge from the outlet. It is noted that the plug 12 does not seat in the metering orifice 4, but rather seats in the bore of a casting 40 (FIGURE 3). The bore is of a conical shape which conforms to the general exterior outline of the plug. The casting 40 is bolted, with the small end of the bore at the top, to the bight portion 42 of an upwardly open U-shaped bracket 44 secured to the bottom of the hopper. The bight portion 42 has a central opening therein with which the bore of the casting is aligned, and this central opening is also aligned with the orifice 4. The orifice 4 is of somewhat smaller size than either the casting bore or the central opening of the bracket so that under a maximum discharge condition the rate at which water is discharged from the hopper is limited by the orifice 4 rather than by either of the other openings.

The toggle mechanism as a whole is also secured to the bottom of the bight portion 42 of the U-shaped bracket 44, spaced to one side of the opening in the bight portion, by bolting the web of a stationary channel-shaped bracket 46 to the bight 42 of the U-shaped bracket. The downwardly projecting flanges 48 of the channel-bracket have the crank means and the rocker means of the toggle mechanism pivotally secured thereto for movement about their respective axes, the crank means pivoting about a shaft 50 and the rocker means pivoting about the parallel, but spaced apart, shaft 52.

The crank means of the mechanism has imposed thereon the counter clockwise moment derived from the weight means 14 and the opposing clockwise moment derived from the receptacle weight, and assumes one position or another accordingly. The crank means may be considered as including the supporting links 38 connected to the chute 34, the oppositely projecting bars 54 carrying a first weight 56 somewhere near their outer end, and the crank stems 58. Auxiliary bars 60 carrying auxiliary or second weights 62 for purposes to be hereinafter described also form part of the crank means.

The rocker or driven means of the toggle mechanism includes a pair of rocker arms 64, each of which has one end pivotally connected to shaft 52 carried by the flanges 48, and the other end carrying the transverse platform 66 from one face of which the plug 12 projects.

The connecting linkage between the crank means and the rocker means of the toggle mechanism includes the pair of links 68, each of which extends from one pivotal connection 70 near the lower end of the crank stem 58 to another pivotal connection 72 on the rocker arm 64.

Figure 2:
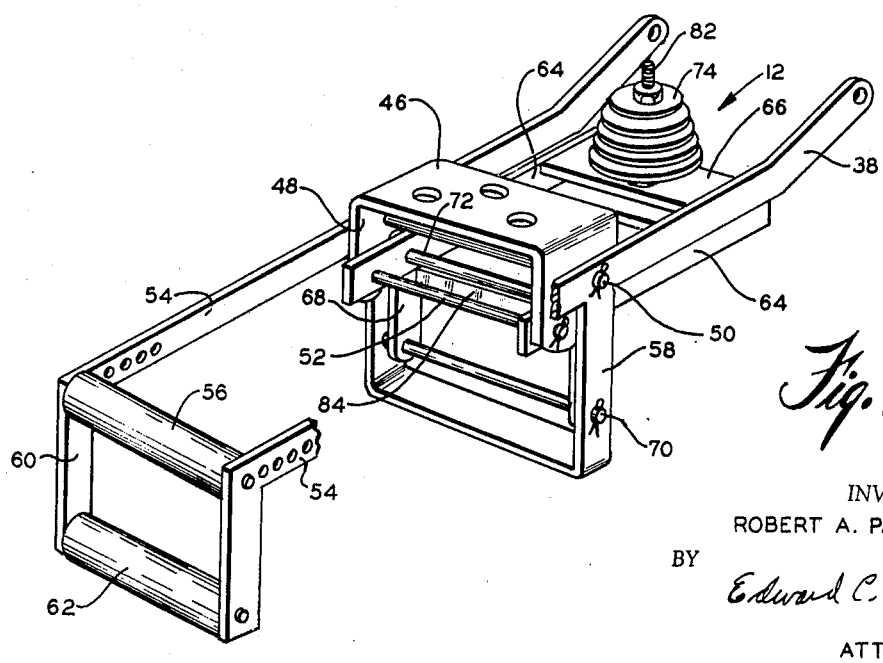
FIGURE 2 is an isometric view of a part of the apparatus.

As is illustrated in the drawing, the distance between the crank means shaft 50 and the link pivotal connection 70 is considerably greater than the distance between the rocker means shaft 52 and the link pivotal connection 72. This difference in distance, coupled with the spaced apart relation of the crank shaft 50 and the rocker shaft 52, results in achieving the toggle effect of the mechanism. One result is that a very great resistance may be overcome with a slight force when a dead center position of the mechanism is approached, i.e., when the crank stems 58 and links 68 approach the parallel position best shown in FIGURE 2. This permits the plug 12 to be forced into a sealing position in the casting 40 against a substantial force of exiting water and a build up of dirt on the plug or in the casting bore. Another result is that angular movement of the rocker means from a fully open outlet position to a fully closed outlet position progressively decreases relative to the corresponding angular movement of the crank means.

It will also be noted that with the toggle mechanism described, the angle through which the crank means turns between extreme positions is considerably less than the angle through which the rocker means turns in moving between corresponding extreme positions. Thus the rocker arms 64 rotate through about 90 degrees in moving from the fully closed position to the fully open position so that the platform 66 and the plug 12 are all completely out of the path of discharge of water from the hopper. Insofar as the discharging water normally carries a substantial quantity of dirt it is desirable that the water not contact the plug since this might tend to build up dirt deposits thereon which would make subsequent tight seating of the plug more difficult. The arrangement also reduces splashing of the discharging water about the base of the hopper.

Figure 4:
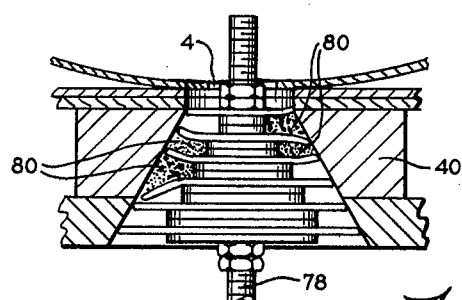
FIGURE 4 is an enlarged vertical sectional view of the plug closing the hopper outlet under adverse seating conditions.

As a further measure for insuring reasonably tight seating of the plug 12 within the bore when necessary, the plug is formed of individual, co-axially arranged flexible discs 74 of progressively reduced diameter alternating with smaller washers 76, both the discs and washers being stacked on a threaded rod 78. With this arrangement, the effect of build up of dirt in some of the annular spaces between adjacent discs, or on some surfaces of the bore within which the plug seats, is minimized. The seating condition when dirt build up is present is illustrated in FIGURE 4 wherein the dirt deposits 80 have caused deflection of parts of certain discs 74, but the other parts and other discs adequately perform the sealing function.

A further feature in connection with plug configuration is the provision of the extended upper end 82 of the threaded rod 78. This end projects through the metering orifice 4 when the plug is fully seated. This arrangement is effective for breaking up dirt which settles in the hopper and bridges across the metering orifice when the plug is in a closed position. Thus each time the plug fully seats, or opens from the fully seated position, the rod upper end 82 tends to dislodge any bridging material it contacts.

The joints between moving parts of the apparatus are preferably made "sloppy" so that no lubrication is required and binding due to deposit of dirt is avoided. Slippage, due to the sloppy joints, in the final outlet closing movement of the rocker arms 64 may be reduced by the provision of the cross bar 84 extending between the connecting links 68 and disposed to engage the lower edges of the rocker arms 64 in that final movement.

In considering operation of the apparatus, the hopper discharge orifice 4 size is selected for a desired discharge rate. Then the make up water supply rate is determined on the basis of compensating for the hopper discharge rate and evaporation rate, and providing enough overflow into receptacle 8 so that tank 26 is full. Under these normal conditions, the weight of the water and the receptacle and associated parts, results in a clockwise moment about shaft 50 sufficiently exceeding the counter-clockwise moment thereabout exerted by the weight means 14 and its respective lever arm that the toggle mechanism takes the broken line position of FIGURES 1 and 3, with the receptacle 8 in its lowermost position. In this position sluicing from the hopper is at the maximum rate determined by the size of the hopper orifice 4. The water in tank 26 drains through orifice 32 at a metered rate, and if the rate at which overflow water is received exceeds the rate of flow through orifice 32, the excess will overflow the petition 24 and also pass to drain by way of the chute 34.

If the supply of make up water to the control box is reduced to a degree that there is no overflow into the tank 26, then as the level in that tank drops due to runout through orifice 32, the clockwise moment about shaft 50 decreases. When the decrease in clockwise moment is sufficient that the counterclockwise moment due to the weight means 14 and respective lever arm, exceeds it, the toggle mechanism is quickly actuated toward a plug closing position. The exact position that the plug assumes relative to its seat will of course be a function of the difference in opposing moments and the resistance to seating which the plug encounters as it approaches its seat. If all of the water drains from the tank 26, the plug will fully seat and terminate all discharge from the hopper, it being noted that due to the toggle effect of the mechanism there is a substantial mechanical advantage available in the final closing movement of the plug into the seat.

Since any continued reduction in make up water supply rate ultimately results in at least a partial closing of the hopper outlet, and a consequent reduction of contaminated water discharge rate through that outlet, the reduced supply rate does not necessarily result in a correspondingly reduced overflow rate. The apparatus may reach a balanced point where the partially full tank 26 receives overflow water at substantially the same rate as it flows out of the tank 26 through the orifice 32, with the plug in a position partially restricting discharge of the hopper water. Alternatively, the reduced hopper discharge may result in an overflow rate sufficiently great that the level of overflow water in the tank rises, in which case the plug will gradually be moved away from its seat.

It will be appreciated from the foregoing that a number of interrelated things must be considered in the functioning of the apparatus in its self-correcting manner. To summarize these relationships, it may be said that the position of the hopper outlet plug is generally dependent upon the make up water supply overflow rate, the overflow rate is determined by the makeup water supply rate and the hopper discharge rate, and the hopper discharge rate in turn depends upon the position of the hopper outlet plug.

The effect of the auxiliary weight 62 carried by the auxiliary bars 60, which project at a right angle from the outboard ends of bars 54 carrying the first weight 56, is to accelerate initial movement of the toggle mechanism from the broken line position without correspondingly increasing the final counter clockwise moment as the mechanism reaches the solid line position of FIGURES 1 and 3. In explanation, with the arrangement shown, the counter clockwise moment due to both the first and second weights, when the plug is in a fully closed position, is the same as that counter clockwise moment would be if both weights occupied the position of the first weight 56. This is of course due to the fact that the moment is the product of the force times the perpendicular distance from the axis of rotation (shaft 50) to the line of action of that force. However, when the apparatus is in the broken line position with the plug fully open, the counter clockwise moment due to the two weights is greater than if the two weights were in the first weight position. This is of course due to the lever arm of the second weight being greater than the lever arm of the first weight in that broken line position. Thus there is the accelerated initial movement of the apparatus in the counter clockwise direction without an accompanying increased counter clockwise moment in the final plug closing movement.

The invention claimed is:

1. In a wet-type dust arrester of the type including a liquid hopper, an improved liquid control device for said hopper comprising: liquid make-up means providing make-up liquid for said hopper, overflow means from said hopper to remove excess liquid from said hopper, contaminated liquid outlet means from said hopper below said overflow means to remove contaminated liquid from said hopper at a rate lower than the rate at which said liquid make-up means supplies liquid to said hopper; valve means to cooperate with said outlet means of said hopper to control fluid flow therefrom; rocker arm means carrying said valve means, said rocker arm means being pivotally mounted about a pivot axis adjacent said liquid outlet means to move said valve means with relation to said liquid outlet means; crank means pivotally mounted about a pivot axis adjacent said liquid outlet means; counterweight means joined to said crank means to exert a first force on said crank means; overflow accumulation means disposed adjacent said overflow means movably responsive to a preselected amount of liquid accumulated therein from said overflow means, said accumulation means being joined to said crank means to exert a second force on said crank means, said second force being proportional to the amount of said excess liquid accumulated in said overflow accumulation means; and linkage means joining said crank means and said rocker arm means, said linkage means being positioned so that movement of said crank means in response to said first force of said counterweight means urges said rocker arm means and said valve means in a first direction relative said hopper outlet means, and movement of said crank means in response to said second force of said overflow accumulation means urges said rocker arm means and said valve means in a second direction relative said hopper outlet means.

2. The apparatus of claim 1 wherein: said counterweight means includes a first and a second weight having substantially equal lever arm lengths relative the pivot axis of said crank means when said valve means is in a first position relative said outlet means and unequal lever arm lengths relative the pivot axis of said crank means when said valve means is in a second position relative said outlet means.

3. The apparatus of claim 1 wherein the pivot axes of said pivotally mounted crank means and said pivotally mounted rocker arm means are offset from each other, and said linkage means is joined to said rocker arm means and said crank means to provide proportionally decreasing movement of said rocker arm means relative to the movement of said crank means as said valve moves in one direction relative said outlet means and wherein said valve means can be completely removed from the path of liquid flow out of said outlet means.

4. The apparatus of claim 3 wherein: said overflow accumulation means includes drain means for draining accumulated overflow liquid from said overflow accumulation means at a predetermined rate below the rate at which said liquid is received in said accumulation means.

5. The apparatus of claim 3 wherein: said hopper outlet means includes a conically shaped seat and said valve means includes a correspondingly shaped plug to nest in sealing relation with said outlet, said plug including a series of flexible discs of graduated diameter, and washer means of reduced diameter alternating with said flexible discs to provide annular spaces between said discs.

6. In a wet-type dust arrester of the type including a liquid hopper, an improved liquid control device for said hopper comprising: liquid outlet means from said hopper disposed in the lower portion thereof; liquid make-up means for adding make-up liquid to said hopper; overflow means from said hopper disposed above said liquid outlet means passing to overflow that quantity of said make-up liquid in excess of that quantity required to maintain a predetermined level of said liquid in said hopper; overflow accumulation means disposed adjacent said overflow means movably responsive to a preselected amount of liquid accumulated therein from said overflow means; valve means cooperating with said hopper outlet means to control the flow therefrom; toggle means operatively connected to said valve means; counterweight means connected to said toggle means to exert a first moment on said toggle means; and means connecting said accumulation means to said toggle means to exert a second moment on said toggle means, wherein the resulting moment is proportional to the accumulation of overflow in said accumulation means to cause said valve means to move in one direction relative said outlet means as a result of one preselected resultant moment and in a second direction relative said outlet as a result of a second preselected resultant moment.

References Cited by the Examiner

UNITED STATES PATENTS

| | | | |
|---|---|---|---|
| 1,181,067 | 4/1916 | Dod | 55—216 |
| 1,422,938 | 7/1922 | Dorsey | 222—57 X |
| 1,449,857 | 3/1923 | Hay | 55—215 |
| 2,102,311 | 12/1937 | Fisher et al. | 222—58 |
| 2,296,750 | 9/1942 | Tucker | 55—210 X |
| 2,403,545 | 7/1949 | Nutting | 261—19 |

ROBERT F. BURNETT, *Primary Examiner.*

HARRY B. THORNTON, *Examiner.*

D. K. DENENBERG, L. H. McCARTER,
*Assistant Examiners.*